United States Patent [19]

Nishino et al.

[11] Patent Number: 4,500,327

[45] Date of Patent: Feb. 19, 1985

[54] PROCESS FOR REMOVAL OF MERCURY VAPOR AND ADSORBENT THEREFOR

[75] Inventors: Hiroshi Nishino, Suita; Toshio Aibe; Katsuya Noguchi, both of Toyonaka, all of Japan

[73] Assignee: Takeda Chemical Industries, Ltd., Osaka, Japan

[21] Appl. No.: 509,232

[22] Filed: Jun. 28, 1983

[30] Foreign Application Priority Data

| Jul. 8, 1982 | [JP] | Japan | 57-119409 |
| Oct. 25, 1982 | [JP] | Japan | 57-186990 |
| Oct. 25, 1982 | [JP] | Japan | 57-186991 |
| Mar. 3, 1983 | [JP] | Japan | 58-34922 |

[51] Int. Cl.$^3$ .................................. B01D 53/04
[52] U.S. Cl. .................................. 55/72; 55/74; 55/387
[58] Field of Search .................... 55/72, 74, 387

[56] References Cited

U.S. PATENT DOCUMENTS

| 3,193,987 | 7/1965 | Manes et al. ............................. 55/72 |
| 3,194,629 | 7/1965 | Dreibelbis et al. .................... 55/72 X |
| 3,512,220 | 5/1970 | Hund et al. ............................ 55/72 X |
| 3,662,523 | 5/1972 | Revoir et al. .......................... 55/72 X |
| 3,755,161 | 8/1973 | Yokota et al. ......................... 55/72 X |
| 3,755,989 | 9/1973 | Fornoff et al. ........................ 55/72 |
| 3,786,619 | 1/1974 | Melkersson et al. ................... 55/72 |
| 3,803,803 | 4/1974 | Raduly et al. ......................... 55/72 |
| 3,933,431 | 1/1976 | Trujillo et al. ....................... 55/72 X |
| 4,016,242 | 4/1977 | Deitz et al. ........................... 55/74 X |
| 4,094,777 | 6/1978 | Sugier et al. .......................... 55/74 X |
| 4,101,631 | 7/1978 | Ambrosini et al. .................... 55/72 X |
| 4,111,833 | 9/1978 | Evans ................................... 55/387 X |
| 4,139,354 | 2/1979 | Giles ...................................... 55/72 X |
| 4,286,972 | 9/1981 | Savage et al. ......................... 55/74 X |

FOREIGN PATENT DOCUMENTS

| 44155 | 11/1972 | Japan . |
| 53590 | 5/1974 | Japan ................................... 55/72 |
| 53591 | 5/1974 | Japan ................................... 55/72 |
| 53593 | 5/1974 | Japan ................................... 55/72 |
| 158592 | 12/1975 | Japan ................................... 55/72 |
| 48226 | 5/1981 | Japan ................................... 55/72 |

OTHER PUBLICATIONS

Chemical Reviews, vol. 43, pp. 69-70, 127-128, 1948.

Primary Examiner—Robert Spitzer
Attorney, Agent, or Firm—Wenderoth, Lind & Ponack

[57] ABSTRACT

Mercury vapor in a gas can easily be removed from the gas by contacting the gas with an adsorbent comprising an activated carbon having as supported thereon (1) one or more components included in one of three groups shown below and (2) one or more components included in the remaining two groups shown below.

| Group | Component |
|---|---|
| I | sulfur |
| II | sulfate and nitrate of Al, V, Fe, Co, Ni, Cu, Zn or $NH_4$ |
| III | oxide of iodine, oxyacid corresponding to the oxide of iodine, salt of said oxyacid, and bromide and iodide of K, Na or $NH_4$ |

18 Claims, No Drawings

PROCESS FOR REMOVAL OF MERCURY VAPOR AND ADSORBENT THEREFOR

The present invention relates to a process for the removal of mercury vapor and an adsorbent therefor.

Electrolytic hydrogen is used in manufacturing various products such as pharmaceutical and food products, whereby trace amounts of mercury vapor act as catalyst poison and also contaminate such products, thus constituting in some instances the cause of much argument. Mercury vapor contained in natural gas corrodes heat exchangers made of aluminum and other types of equipment in the process of gas liquefaction, and is responsible for serious disasters. Also, mercury vapor contained in incinerator waste gases and waste gases from factories handling mercury is regarded as controversial from the standpoints of air pollution control and working environment preservation.

Therefore, it becomes necessary to remove mercury vapor in these gases by means of some appropriate treatment. As the method of removing mercury vapor in gas, there have been conventionally known the process of washing with chemical solutions and the method of dry adsorbing with use of adsorbents such as activated carbon and ion exchange resins. Nevertheless, the process of washing with chemical solutions suffers from the defects that the efficiency of removal of mercury vapor is poor and that waste solutions are produced, while the dry adsorption method, with its small capacity to adsorb mercury vapor, is far from satisfactory.

The present inventors, in view of such circumstances, conducted extensive research, and as a result, have come to the finding that the adsorbents, which consist of activated carbon having as supported thereon two or more specific components selected from (I) sulfur, (II) specific salt components and (III) specific halogen compounds, efficiently adsorb mercury vapor in gases and also exhibit an outstandingly increased adsorption capacity.

Thus the present invention relates to:

a process for the removal of mercury vapor from a gas containing the same, which comprises contacting the gas with an adsorbent comprising activated carbon having as supported thereon (1) one or more components included in one of the three groups shown below and (2) one or more components included in the remaining two groups shown below:

| Group | Component |
|-------|-----------|
| I | sulfur |
| II | sulfate and nitrate of Al, V, Fe, Co, Ni, Cu, Zn or $NH_4$ |
| III | oxide of iodine, oxyacid corresponding to the oxide of iodine, salt of said oxyacid, and bromide and iodide of K, Na or $NH_4$ |

The invention also relates to an adsorbent used in the above process.

The adsorbent of the present invention can be prepared by having (1) one or more components included in one of the three groups shown above and (2) one or more components included in the remaining two groups shown above supported on activated carbon.

The activated carbon, which is used in this case, may be any type, so long as it is manufactured by a known process from wood charcoal, coal, coke, coconut shells, resins, etc. employed as raw materials and exhibits a specific surface area of 200 to 2000 $m^2/g$.

Examples of the components of Group II include sulfates such as $(NH_4)_2SO_4$, $Al_2(SO_4)_3$, $VOSO_4$, $FeSO_4$, $Fe_2(SO_4)_3$, $CoSO_4$, $NiSO_4$, $CuSO_4$, $ZnSO_4$, etc. and nitrates such as $NH_4NO_3$, $Al(NO_3)_3$, $VO(NO_3)_2$, $Fe(NO_3)_2$, $Fe(NO_3)_3$, $Co(NO_3)_2$, $Ni(NO_3)_2$, $Cu(NO_3)_2$, $Zn(NO_3)_2$, etc.

Examples of the components of Group III include oxides of iodine such as $I_2O_5$, $IO_2$, etc., oxyacids corresponding to the oxide of iodine such as $HIO_2$, $HIO_3$, etc., salts of said oxyacids such as alkali metal salts (e.g. $NaIO_2$, $KIO_2$, $NaIO_3$, $KIO_3$, $NaIO_4$, $KIO_4$), alkaline earth metal salts (e.g. $Mg(IO_3)_2$, $Ca(IO_3)_2$, $Sr(IO_3)_2$), ammonium salts (e.g. $NH_4IO_3$, $NH_4IO_4$), etc., bromides such as KBr, NaBr, $NH_4Br$, etc., and iodides such as KI, NaI, $NH_4I$, $KI_3$, etc.

When sulfur of Group I is used, the amount of sulfur to be supported is 10 to 800 mg per g of activated carbon, preferably 20 to 600 mg. When the component or components of Group II is used, the amount of component or total amount of components of Group II is 5 to 500 mg per g of activated carbon, preferably 10 to 400 mg. When the component or components of Group III is used, the amount of the component or total amount of components of Group III is 1 to 500 mg per g of activated carbon, preferably 2 to 400 mg, most preferably 10 to 400 mg.

In order to allow activated carbon to support the components selected from Groups I, II and III, in the manufacture of the adsorbent for mercury vapor according to the present invention, there may be mentioned, by way of example, the method which comprises dissolving or suspending these components to be supported together in water or a water-soluble solvent and impregnating or spraying activated carbon with the resultant solution or suspension, followed by heating at 110° to 400° C., if necessary. Also, each of these components may be supported on activated carbon, individually, and the order thereof may be arbitrary.

The heating procedure as described above can be carried out for example in the presence of nitrogen gas, carbon dioxide gas, steam, air, oxygen-containing gas, combustion gas or gas mixtures thereof. As the means of heating, any procedure may be employed, and use is desirably made for example of the method which comprises contacting the above-mentioned gas with activated carbon under heating. As the mode of contacting in this case, there may be mentioned the fixed-bed, moving-bed, fluidized-bed, slurry and rotary-kiln types and others. The heating time varies with the kind and temperature of the surrounding gases, etc., and is normally not less than 10 minutes, preferably ½ to 24 hours.

With reference to the adsorbents for mercury vapor according to the present invention, the adsorbent having component of Group I, component(s) included in Group II and component(s) included in Group III exhibits greater removal efficiency and adsorption capacity for mercury than the one having component(s) included in one of the three groups and component(s) included in only one of the remaining two groups.

Further, the adsorbent of the present invention may be an activated carbon having as supported thereon one or more sulfur compounds in addition to the components included in Group I, II and III. Examples of the sulfur compound include thiocyanates such as $NH_4SCN$, NaSCN, KSCN, $Mg(SCN)_2$, $Ca(SCN)_2$ and $Sr(SCN)_2$, thiosulfates such as $(NH_4)_2S_2O_3$, $Na_2S_2O_3$, $K_2S_2O_3$, $MgS_2O_3$, $CaS_2O_3$ and $SrS_2O_3$, sulfamates such as $NH_4OSO_2NH_2$, $NaOSO_2NH_2$, $KOSO_2NH_2$, $Mg(OSO_2NH_2)_2$, $Ca(OSO_2NH_2)_2$ and $Sr(OSO_2NH_2)_2$, and sulfides such as $(NH_4)_2S$, $Na_2S$, $K_2S$, MgS, CaS and SrS. The total amount of the sulfur compounds is usually 10 to 800 mg per g of activated carbon, preferably 20 to 600 mg.

The process for the removal of mercury vapor of the present invention is carried out by contacting a gas containing mercury vapor with the adsorbent of the present invention. The contacting temperature is not more than 150° C., preferably −10° to 120° C., more preferably 0° to 120° C., and the contacting pressure is not more than 100 kg/cm², preferably 0.1 to 70 kg/cm², while the contacting time at 25° C. and at 1 kg/cm² is 1/10 to 30 seconds, preferably 1/5 to 20 seconds. Also, contact between the said adsorbent and the gas containing vaporized mercury can be effected for example by means of the fixed-bed, moving-bed and fluidized-bed operations.

Further, the present inventors have found that an activated carbon having sulfur supporting thereon is desirably prepared by mixing activated carbon with finely powdered sulfur and heating the resultant mixture at 110° to 350° C., preferably 110° to 300° C.

The fine particles of sulfur, which is used in this preparation, may be any of fine pulverized sulfur, if it shows a grain size of not more than 8 mesh, preferably not more than 10 mesh. The amount of sulfur to be supported onto activated carbon is normally 10 to 800 mg per g of activated carbon. In the preparation process, the first step is conducted into practice by mixing activated carbon uniformly with fine particles of sulfur. Such procedure may be carried out by mixing directly activated carbon with fine particles of sulfur, whereby water or solvent mixtures of water-soluble solvents (e.g., alcohols, etc.) with water may be desirably employed. In the case of the use of water or solvent mixtures, examples of the procedure include a procedure which comprises firstly suspending fine particles of sulfur in water or solvent mixture and impregnating or spraying activated carbon with the resultant suspension, and a procedure which comprises impregnating activated carbon with water or solvent mixture and coating it with fine particles of sulfur. In case of preparing an activated carbon having as supported thereon sulfur and another component or components defined in the present invention, it is preferable to dissolve or suspend in advance, in water or solvent mixture as mentioned above, the components intended to be supported on activated carbon. Each amount of the components to be supported is as defined above. The means of mixing may be any means, such as mixer, sugar-coating machine and agitator, which may be utilized for mixing solids. A mixture of activated carbon and fine particles of sulfur, along with other components, if necessary, is subsequently heated at 110° C. to 350° C., preferably 110° C. to 300° C. Heating can be effected for example in the presence of nitrogen gas, carbon dioxide gas, steam, combustion gas, air, oxygen-containing gas or gas mixtures thereof. The means of heating may be any of means, whereby, for example, the procedure comprising heating the above gases and contacting them with a mixture of activated carbon and sulfur is desirably employed. As the mode of contacting in this case, there may be mentioned fixed-bed, moving-bed, fluidized-bed, slurry and rotary-kiln types, and other. The heating time varies with the kinds and temperatures of the surrounding gases, etc., and is normally not less than 30 minutes, preferably 1 to 240 hours, more preferably 1 to 50 hrs. It should be noted that when the above heating temperature is lower than 110° C., sulfur fails to reach the inner surface of activated carbon and therefore, the activated carbon having as supported thereon sulfur showing excellent adsorption effect cannot be obtained. Conversely, the increased heating temperature in excess of 350° C. causes sulfur vapor to be generated, and is consequently unfavorable. The activated carbon having as supported thereon sulfur as obtained by the above procedure has sulfur supported uniformly on the pore surface of activated carbon, and possesses excellent adsorption capacity for mercury vapor and so forth.

EXAMPLE 1

Activated carbon $A_0$ of 16 to 24 mesh having a BET specific surface area of 1230 m²/g was evenly sprayed with an aqueous solution or suspension of the given amount of the components, other than sulfur, shown in the following table. When sulfur is used, the given amount of finely powdered sulfur was mixed with the activated carbon. The activated carbon was then heated in air at 110° C.

(Adsorbents (1)–(64))

As controls, activated carbon $A_0$ was mixed, in the same procedure as described above, with the given amount of each of the components alone, and heated at 110° C.

(Adsorbents $A_1$ through $A_{16}$)

Six ml each of the Adsorbents $A_0$ through $A_{16}$ and (1) through (64) as obtained by the above procedures were packed into a 1.6 cmφ glass column, respectively, and nitrogen gas of 25° C. containing 9 mg/m³ of mercury vapor was passed through each column at a linear flow rate of 40 cm/sec to conduct the breakthrough adsorption tests for mercury vapor. The results are as shown in Table 1.

TABLE 1

| Adsorbent No. | The first component or additive; and its amount supported (mg/g) | The second component; and its amount supported (mg/g) | The third component; and its amount supported (mg/g) | Percent removal of mercury vapor at the elapsed time shown below (%) | | | |
|---|---|---|---|---|---|---|---|
| | | | | 5 hrs. | 10 hrs. | 20 hrs. | 50 hrs. |
| $A_0$ (Control) | 0 | 0 | 0 | 0 | 0 | 0 | 0 |
| $A_1$ (Control) | 0 | 0 | $NH_4I$-150 | 53 | 28 | 3 | 0 |
| $A_2$ (Control) | 0 | 0 | NaI-150 | 59 | 35 | 3 | 0 |
| $A_3$ (Control) | 0 | 0 | KI-150 | 78 | 51 | 15 | 0 |
| $A_4$ (Control) | 0 | 0 | KBr-150 | 48 | 35 | 7 | 0 |
| $A_5$ (Control) | 0 | $Al_2(SO_4)_3$-100 | 0 | 21 | 3 | 0 | 0 |
| $A_6$ (Control) | 0 | $FeSO_4$-100 | 0 | 66 | 42 | 28 | — |
| $A_7$ (Control) | 0 | $CuSO_4$-100 | 0 | 89 | 61 | 29 | 8 |
| $A_8$ (Control) | 0 | $CoSO_4$-100 | 0/ 55 | 40 | 23 | 10 | |

TABLE 1-continued

| Adsorbent No. | The first component or additive; and its amount supported (mg/g) | The second component; and its amount supported (mg/g) | The third component; and its amount supported (mg/g) | Percent removal of mercury vapor at the elasped time shown below (%) | | | |
|---|---|---|---|---|---|---|---|
| | | | | 5 hrs. | 10 hrs. | 20 hrs. | 50 hrs. |
| $A_9$ (Control) | 0 | $NH_4NO_3$-100 | 0 | 33 | 9 | 0 | 0 |
| $A_{10}$ (Control) | 0 | $Fe(NO_3)_3$-100 | 0 | 96 | 84 | 50 | 11 |
| $A_{11}$ (Control) | 0 | $(NH_4)_2SO_4$-100 | 0 | 19 | 5 | 0 | 0 |
| $A_{12}$ (Control) | S-100 | 0 | 0 | 68 | 50 | 38 | 24 |
| $A_{13}$ (Control) | S-200 | 0 | 0 | 51 | 41 | 30 | 25 |
| $A_{14}$ (Control) | 0 | $ZnSO_4$-100 | 0 | 35 | 5 | 0 | 0 |
| $A_{15}$ (Control) | 0 | $Zn(NO_3)_2$-100 | 0 | 88 | 74 | 43 | 10 |
| $A_{16}$ (Control) | 0 | 0 | HI-100 | 85 | 13 | 0 | 0 |
| (1) (This invention) | S-100 | 0 | $NH_4I$-10 | 93 | 85 | 59 | 30 |
| (2) (This invention) | S-100 | 0 | NaI-10 | 90 | 72 | 48 | 31 |
| (3) (This invention) | S-100 | 0 | KI-10 | 94 | 78 | 45 | 29 |
| (4) (This invention) | S-100 | 0 | KBr-10 | 91 | 71 | 50 | 42 |
| (5) (This invention) | S-100 | 0 | $NH_4Br$-10 | 88 | 73 | 49 | 41 |
| (6) (This invention) | S-100 | 0 | KI-5 KBr-5 | 94 | 85 | 61 | 49 |
| (7) (This invention) | S-100 | 0 | NaI-5 KBr-5 | 92 | 73 | 47 | 41 |
| (8) (This invention) | S-100 | 0 | KI-2 | 81 | 65 | 41 | 31 |
| (9) (This invention) | S-150 | 0 | KI-5 | 83 | 66 | 40 | 33 |
| (10) (This invention) | S-200 | 0 | KI-5 | 80 | 67 | 43/ 35 | |
| (11) (This invention) | S-100 | $Al(SO_4)_3$-10 | 0 | 88 | 71 | 45 | 32 |
| (12) (This invention) | S-100 | $FeSO_4$-10 | 0 | 95 | 78 | 51 | 23 |
| (13) (This invention) | S-100 | $CuSO_4$-10 | 0 | 95 | 88 | 69 | 48 |
| (14) (This invention) | S-100 | $CoSO_4$-10 | 0 | 89 | 75 | 61 | 38 |
| (15) (This invention) | S-100 | $NiSO_4$-10 | 0 | 90 | 75 | 63 | 41 |
| (16) (This invention) | S-100 | $VOSO_4$-10 | 0 | 99 | 70 | 48 | 39 |
| (17) (This invention) | S-100 | $(NH_4)_2SO_4$-10 | 0 | 81 | 61 | 51 | 39 |
| (18) (This invention) | S-100 | $Fe(NO_3)_2$-10 | 0 | 93 | 67 | 53 | 44 |
| (19) (This invention) | S-100 | $Co(NO_3)_2$-10 | 0 | 96 | 75 | 64 | 40 |
| (20) (This invention) | S-100 | $FeSO_4$-5 | 0 | 89 | 75 | 60 | 33 |
| (21) (This invention) | S-150 | $FeSO_4$-5 | 0 | 88 | 76 | 63 | 38 |
| (22) (This invention) | S-200 | $FeSO_4$-5 | 0 | 90 | 78 | 65 | 41 |
| (23) (This invention) | S-100 | $ZnSO_4$-10 | 0 | 80 | 71 | 43 | 37 |
| (24) (This invention) | S-100 | $FeSO_4$-5 $CuSO_4$-5 | 0 | 96 | 80 | 52 | 41 |
| (25) (This invention) | S-100 | $FeSO_4$-5 $Fe(NO_3)_3$-5 | 0 | 91 | 73 | 60 | 43 |
| (26) (This invention) | 0 | $(NH_4)_2SO_4$-50 | $I_2O_5$-50/ 100 | 100 | 100 | 85 | |
| (27) (This invention) | 0 | $Al_2(SO_4)_3$-50 | $I_2O_5$-50 | 100 | 100 | 100 | 98 |
| (28) (This invention) | 0 | $Fe_2(SO_4)_3$-50 | $I_2O_5$-50 | 100 | 100 | 100 | 93 |
| (29) (This invention) | 0 | $Fe(NO_3)_3$-50 | $I_2O_5$-50 | 100 | 100 | 100 | 96 |
| (30) (This invention) | 0 | $Co(NO_3)_2$-50 | $I_2O_5$-50 | 100 | 100 | 100 | 97 |
| (31) (This invention) | 0 | $Ni(NO_3)_2$-50 | $HIO_3$-50 | 100 | 100 | 100 | 98 |
| (32) (This invention) | S-50 | 0 | $I_2O_5$-50 | 100 | 100 | 100 | 95 |
| (33) (This invention) | S-50 | $VOSO_4$-50 | $I_2O_5$-50 | 100 | 100 | 100 | 100 |
| (34) (This invention) | S-50 | $FeSO_4$-50 | $I_2O_5$-50 | 100 | 100 | 100 | 100 |
| (35) (This invention) | $NaOSO_2NH_2$-50 | $ZnSO_4$-50 | $I_2O_5$-50 | 100 | 100 | 100 | 100 |
| (36) (This invention) | $K_2S_2O_3$-50 | $Cu(NO)_3$-50 | $HIO_3$-50 | 100 | 100 | 100 | 100 |
| (37) (This invention) | $K_2S$-50 | $FeSO_4$-50 | $I_2O_5$-50 | 100 | 100 | 100 | 100 |
| (38) (This invention) | 0 | $FeSO_4$-50 | $KIO_4$-50 | 100 | 100 | 100 | 63 |
| (39) (This invention) | S-50 | $FeSO_4$50 | $Mg(IO_3)_2$-50 | 100 | 100 | 100 | 100 |
| (40) (This invention) | 0 | $(NH_4)_2SO_4$-50 | $NH_4I$-75 | 100 | 100 | 100 | 75 |
| (41) (This invention) | 0 | $Al_2(SO_4)_3$-50 | NaI-75 | 100 | 100 | 100 | 88 |
| (42) (This invention) | 0 | $VOSO_4$-50 | KI-75 | 100 | 100 | 100 | 95 |
| (43) (This invention) | 0 | $CoSO_4$-50 | KBr-75 | 100 | 100 | 100 | 90 |
| (44) (This invention) | 0 | $FeSO_4$-50 | $NH_4Br$-75 | 100 | 100 | 100 | 88 |
| (45) (This invention) | 0 | $FeSO_4$-50 | KI-75 | 100 | 100 | 100 | 93 |
| (46) (This invention) | 0 | $CoSO_4$-50 | $NH_4I$-75 | 100 | 100 | 100 | 89 |
| (47) (This invention) | 0 | $NiSO_4$-50 | KI-75 | 100 | 100 | 100 | 88 |
| (48) (This invention) | 0 | $CuSO_4$-50 | $KIO_3$-75 | 100 | 100 | 100 | 83 |
| (49) (This invention) | 0 | $ZnSO_4$-50 | $NaBrO_3$-75 | 100 | 100 | 100 | 80 |
| (50) (This invention) | 0 | $CuSO_4$-50 | $NH_4Br$-75 | 100 | 100 | 100 | 95 |
| (51) (This invention) | 0 | $FeSO_4$-50 | NaI-75 | 100 | 100 | 100 | 78 |
| (52) (This invention) | 0 | $NH_4NO_3$-50 | KI-75 | 100 | 100 | 100 | 73 |
| (53) (This invention) | 0 | $Al(NO_3)_3$-50 | $NH_4I$-75 | 100 | 100 | 100 | 86 |
| (54) (This invention) | 0 | $Fe(NO_3)_3$-50 | NaI-75 | 100 | 100 | 100 | 81 |
| (55) (This invention) | 0 | $Fe(NO_3)_3$-50 | KBr-75 | 100 | 100 | 100 | 83 |
| (56) (This invention) | 0 | $Fe(NO_3)_3$-50 | NaBr-75 | 100 | 100 | 100 | 82 |
| (57) (This invention) | 0 | $Co(NO_3)_2$-50 | $NH_4I$-75 | 100 | 100 | 100 | 91 |
| (58) (This invention) | 0 | $Ni(NO_3)_2$-50 | NaI-75 | 100 | 100 | 100 | 89 |
| (59) (This invention) | 0 | $Cu(NO_3)_2$-50 | KI-75 | 100 | 100 | 100 | 96 |
| (60) (This invention) | 0 | $Zn(NO_3)_2$-50 | KI-75 | 100 | 100 | 100 | 91 |
| (61) (This invention) | 0 | $FeSO_4$-100 | KI-400 | 100 | 100 | 100 | 100 |
| (62) (This invention) | 0 | $FeSO_4$-100 | KI-200 | 100 | 100 | 100 | 100 |
| (63) (This invention) | 0 | $FeSO_4$-100 | KI-50 | 100 | 100 | 100 | 65 |

TABLE 1-continued

| Adsorbent No. | The first component or additive; and its amount supported (mg/g) | The second component; and its amount supported (mg/g) | The third component: and its amount supported (mg/g) | Percent removal of mercury vapor at the elasped time shown below (%) | | | |
|---|---|---|---|---|---|---|---|
| | | | | 5 hrs. | 10 hrs. | 20 hrs. | 50 hrs. |
| (64) (This invention) | 0 | $FeSO_4$-100 | KI-10 | 100 | 100 | 100 | 8 |

EXAMPLE 2

A 6 ml portion each of the Adsorbents $A_1$, $A_3$, $A_5$, $A_6$, $A_9$, $A_{10}$, $A_{14}$, (28), (31), (32), (34), (36), (40), (42), (45), (48), (52), (54), (56), and (59) of Example 1 was packed into a 1.6 cm$^\phi$ glass column, respectively, and hydrogen gas of 25° C. containing 1 mg/m$^3$ of mercury vapor was passed through each column at a linear flow rate of 40 cm/sec to conduct the breakthrough adsorption tests for mercury vapor. The result are shown in Table 2.

TABLE 2

| Adsorbent No. | Percent removal of mercury vapor at the elasped time shown below (%) | | | |
|---|---|---|---|---|
| | 50 hrs. | 100 hrs. | 150 hrs. | 200 hrs. |
| $A_1$ (control) | 42 | 15 | 6 | 0 |
| $A_3$ (control) | 65 | 35 | 11 | 3 |
| $A_5$ (control) | 42 | 32 | 8 | 0 |
| $A_6$ (control) | 58 | 40 | 13 | 9 |
| $A_9$ (control) | 26 | 15 | 0 | 0 |
| $A_{10}$ (control) | 78 | 43 | 15 | 0 |
| $A_{14}$ (control) | 51 | 23 | 1 | 0 |
| (28) (This invention) | 100 | 100 | 100 | 98 |
| (31) (This invention) | 100 | 100 | 100 | 100 |
| (32) (This invention) | 100 | 100 | 100 | 100 |
| (34) (This invention) | 100 | 100 | 100 | 100 |
| (36) (This invention) | 100 | 100 | 100 | 100 |
| (40) (This invention) | 100 | 100 | 100 | 75 |
| (42) (This invention) | 100 | 100 | 100 | 100 |
| (45) (This invention) | 100 | 100 | 100 | 100 |
| (48) (This invention) | 100 | 100 | 100 | 100 |
| (52) (This invention) | 100 | 100 | 100 | 83 |
| (54) (This invention) | 100 | 100 | 100 | 91 |
| (56) (This invention) | 100 | 100 | 100 | 95 |
| (59) (This invention) | 100 | 100 | 100 | 100 |

EXAMPLE 3

A 6 ml portion each of the Adsorbents $A_1$, $A_3$, $A_5$, $A_6$, $A_{10}$, $A_{14}$, (28), (31), (32), (34), (36), (40), (42), (45), (48), (52), (54), (56) and (59) of Example 1 was packed into a 1.6 cm$^\phi$ glass column, respectively, and a gas (N-84.8 vol.%, $O_2$-14.5 vol.%, $H_2O$-0.7 vol.%) of 25° C. containing 9 mg/m$^3$ of mercury vapor was passed through each column at a linear flow rate of 40 cm/sec to conduct the breakthrough adsorption tests for mercury vapor. The results are as shown in Table 3.

TABLE 3

| Adsorbent No. | Percent removal of mercury vapor at the elasped time shown below (%) | | | |
|---|---|---|---|---|
| | 50 hrs. | 100 hrs. | 150 hrs. | 200 hrs. |
| $A_1$ (Control) | 68 | 39 | 18 | 8 |
| $A_3$ (Control) | 73 | 40 | 24 | 12 |
| $A_5$ (Control) | 63/ 39 | 18 | 10 | |
| $A_6$ (Control) | 63 | 51 | 21 | 15 |
| $A_{10}$ (Control) | 32 | 18 | 4 | 0 |
| $A_{14}$ (Control) | 60 | 35 | 8 | 3 |
| (28) (This invention) | 100 | 100 | 100 | 100 |
| (31) (This invention) | 100 | 100 | 100 | 100 |
| (32) (This invention) | 100 | 100 | 100 | 100 |
| (34) (This invention) | 100 | 100 | 100 | 100 |
| (36) (This invention) | 100 | 100 | 100 | 100 |
| (40) (This invention) | 100 | 100 | 100 | 88 |
| (42) (This invention) | 100 | 100 | 100 | 100 |
| (45) (This invention) | 100 | 100 | 100 | 100 |
| (48) (This invention) | 100 | 100 | 100 | 100 |
| (52) (This invention) | 100 | 100 | 100 | 100 |
| (54) (This invention) | 100 | 100 | 100 | 100 |
| (56) (This invention) | 100 | 100 | 100 | 100 |
| (59) (This invention) | 100 | 100 | 100 | 100 |

EXAMPLE 4

A 6 ml portion each of the Adsorbents $A_3$, $A_6$, $A_{12}$, (2) through (4) and (12) through (14) of Example 1 was packed into a 1.6 cm$^\phi$ glass column, and methane gas of 70° C. containing 9 mg/m$^3$ of mercury vapor was passed through each column at a linear flow rate of 40 cm/sec to conduct the breakthrough adsorption tests for mercury vapor at 70° C. The results are as shown in Table 4.

TABLE 4

| Adsorbent No. | Percent removal of mercury vapor at the elasped time shown below (%) | | | | | | |
|---|---|---|---|---|---|---|---|
| | 5 hrs. | 10 hrs. | 20 hrs. | 50 hrs. | 100 hrs. | 150 hrs. | 200 hrs. |
| $A_3$ (Control) | 58 | 59 | 63 | 63 | 35 | 30 | 23 |
| $A_6$ (Control) | 20 | 38 | 40 | 40 | 39 | 37 | 37 |
| $A_{12}$ (Control) | 55 | 58 | 65 | 68 | 68 | 70 | 70 |
| (2) (This invention) | 95 | 95 | 96 | 96 | 97 | 96 | 96 |
| (3) (This invention) | 96 | 98 | 98 | 98 | 98 | 98 | 99 |
| (4) (This invention) | 95 | 96 | 96 | 96 | 96 | 97 | 97 |
| (12) (This invention) | 97 | 98 | 98 | 99 | 99 | 100 | 100 |
| (13) (This invention) | 98 | 99 | 100 | 100 | 100 | 100 | 100 |
| (14) (This invention) | 95 | 97 | 98 | 98 | 98 | 98 | 98 |

EXAMPLE 5

Activated carbon $a_0$ of 16 to 24 mesh having a BET specific surface area of 1050 m$^2$/g was sprayed with a solution containing respectively the given amount (Table 5) of sulfur (first component), a sulfate or nitrate (second component) and bromide or iodide (third component) (in the case of sulfur, a suspension was used), and subsequently dried at 120° C. (Adsorbents (65) through (80)).

Six ml each of the Adsorbents $a_0$ and (65) through (80) was packed into a 1.6 cm$^\phi$ glass column, respectively, and nitrogen gas of 25° C. containing 9 mg/m$^3$ of mercury vapor was passed through each column at a linear flow rate of 40 cm/sec to conduct the breakthrough adsorption tests for mercury vapor. The results are shown in Table 5.

TABLE 5

| Adsorbent No. | The first component or additive; and its amount supported (mg/g) | The second component; and its amount supported (mg/g) | The third component; and its amount supported (mg/g) | Percent removal of mercury vapor at the elapsed time shown below (%) | | | |
|---|---|---|---|---|---|---|---|
| | | | | 5 hrs. | 10 hrs. | 20 hrs. | 50 hrs. |
| $a_0$ (Control) | 0 | 0 | 0 | 0 | 0 | 0 | 0 |
| (65) (This invention) | S-150 | 0 | KI-100 | 91 | 70 | 40 | 16 |
| (66) (This invention) | S-150 | $FeSO_4$-100 | 0 | 89 | 65 | 40 | 11 |
| (67) (This invention) | S-150 | $Zn(NO_3)_2$-100 | 0 | 68 | 43 | 21 | 7 |
| (68) (This invention) | S-150 | 0 | $NH_4I$-100 | 90 | 81 | 54 | 15 |
| (69) (This invention) | S-75 | $FeSO_4$-50 | KBr-75 | 100 | 100 | 100 | 100 |
| (70) (This invention) | S-75 | $FeSO_4$-50 | NaI-75 | 100 | 100 | 100 | 100 |
| (71) (This invention) | S-75 | $FeSO_4$-50 | KI-75 | 100 | 100 | 100 | 100 |
| (72) (This invention) | S-75 | $CuSO_4$-50 | KI-75 | 100 | 100 | 100 | 100 |
| (73) (This invention) | S-75 | $Zn(NO_3)_2$-50 | KI-75 | 100 | 100 | 100 | 100 |
| (74) (This invention) | S-50 | $VOSO_4$-50 | $NH_4I$-75 | 100 | 100 | 100 | 100 |
| (75) (This invention) | S-50 | $Fe(NO_3)_3$-50 | $KIO_3$-50 | 100 | 100 | 100 | 100 |
| (76) (This invention) | S-50 | $(NH_4)_2SO_4$-50 | $NH_4Br$-75 | 100 | 100 | 100 | 100 |
| (77) (This invention) | S-400 | $FeSO_4$-50 | KI-50 | 100 | 100 | 100 | 100 |
| (78) (This invention) | S-100 | $FeSO_4$-50 | KI-50 | 100 | 100 | 100 | 100 |
| (79) (This invention) | S-50 | $FeSO_4$-50 | KI-50 | 100 | 100 | 100 | 100 |
| (80) (This invention) | S-10 | $FeSO_4$-50 | KI-50 | 100 | 100 | 100 | 99 |

EXAMPLE 6

From activated carbon A of 16 to 24 mesh having a BET surface area of 1100 $m^2/g$, there was prepared the activated carbon having as supported thereon 100 mg/g of sulfur by the following procedure:

(1) Activated carbon having as supported thereon sulfur $B_0$ through $B_3$:

10.0 g of finely powdered sulfur of not more than 50 mesh was uniformly suspended in 90 ml of water, and the suspension was sprayed evenly onto 100 g of activated carbon A.

Part of the activated carbon thus treated was sampled and heated in air for 1 hour at different temperatures of 90° C., 120° C., 150° C. and 200° C., respectively.

(2) Activated carbon having as supported thereon sulfur $C_0$ through $C_2$:

90 ml of water was sprayed evenly on 100 g of activated carbon A, and 10.0 g of finely powdered sulfur was sprayed evenly over the wet activated carbon with stirring to coat the particle-surface of the activated carbon with sulfur.

Part of the activated carbon thus treated was sampled and heated in nitrogen gas for ½ hour at a temperature of 120° C. and 250° C., respectively.

(3) Activated carbon having as supported thereon sulfur D:

90 ml of water was sprayed evenly on 100 g of activated carbon A, and 10.0 g of finely powdered sulfur was sprayed evenly over the wet activated carbon with stirring to coat the particle-surface of the activated carbon with sulfur.

Part of the activated carbon thus treated was sampled and heated in heavy-oil combustion waste gas at 150° C. for 1 hour.

(4) Activated carbon having as supported thereon sulfur $E_0$:

10.0 g of finely powdered sulfur of not more than 50 mesh was dissolved in 120 ml of carbon disulfide, and the solution was sprayed evenly on 100 g of activated carbon A.

Part of the activated carbon thus treated was sampled and heated in nitrogen gas at a temperature of 80° C. for ½ hour.

(5) Activated carbon having as supported thereon sulfur $F_0$:

15 g of activated carbon A was packed into a 2.0 cm$\phi$ quartz glass tube, which was then heated at 140° C. Air of 140° C. containing 1.0 vol.% of $H_2S$ was passed through the packed layer at a linear flow rate of 15 cm/sec (at 25° C.) for 15 hours to have 1.5 g of sulfur supported on the whole amount of activated carbon.

The amount of the sulfur supported was found to decrease in the order of the gas-inlet side, middle and gas-outlet side in the packed layer of activated carbon, with the amounts of sulfur being 14 g/100 g of activated carbon, 10 g/100 g of activated carbon and 6 g/100 g of activated carbon, respectively. The middle layer is referred to as "$F_0$".

6 ml each of the activated carbon samples A, $B_0$ through $B_3$, $C_0$ through $C_2$, D, $E_0$ and $F_0$ as obtained by the above procedures were packed into a 1.6 cm$\phi$ glass column, respectively, and air of 25° C. containing 2.0 mg/$m^3$ of mercury vapor was passed through each column at a linear flow rate of 20 cm/sec to conduct the breakthrough adsorption tests for mercury vapor. The results are as shown in Table 6.

TABLE 6

| Sulfur-supporting method | Sample No. | Heating temp. °C. | Observed conditions of sulfur supported | Removal of mercury vapor at the elapsed time shown below (%) | | | |
|---|---|---|---|---|---|---|---|
| | | | | 2 hr. | 5 hr. | 10 hr. | 20 hr. |
| Sulfur is suspended in water, and the suspension is sprayed on activated carbon, which is heated. | $B_0$ (Control) | 90 | Sulfur particles are adhered to external surface | 10 | 4 | 0 | 0 |
| | $B_1$ (This invention) | 120 | Sulfur is settled and adhered evenly | 100 | 70 | 50 | 30 |

TABLE 6-continued

| Sulfur-supporting method | Sample No. | Heating temp. °C. | Observed conditions of sulfur supported | Removal of mercury vapor at the elasped time shown below (%) | | | |
|---|---|---|---|---|---|---|---|
| | | | | 2 hr. | 5 hr. | 10 hr. | 20 hr. |
| | $B_2$ (This invention) | 150 | Sulfur is settled and adhered evenly inside pores. | 100 | 80 | 63 | 43 |
| | $B_3$ (This invention) | 200 | Sulfur is settled and adhered evenly inside pores. | 100 | 100 | 65 | 45 |
| Activated carbon is wetted on the surface with water, then coated with powdered sulfur and heated. | $C_0$ (Control) | 80 | Sulfur particles are adhered to external surface | 13 | 5 | 0 | 0 |
| | $C_1$ (This invention) | 120 | Sulfur is settled and adhered evenly inside pores. | 100/ 65 | 43 | 31 | |
| | $C_2$ (This invention) | 250 | Sulfur is settled and adhered evenly inside pores. | 100 | 78 | 61 | 42 |
| | D (This invention) | 150 | Sulfur is settled and adhered evenly inside pores. | 100 | 83 | 75 | 60 |
| Sulfur is dissolved in carbon disulfide, and the solution is sprayed on activated carbon, which is heated. | $E_0$ (Control) | 80 | Sulfur is settled and adhered almost evenly inside pores. | 70 | 51 | 32 | 21 |
| A gas containing $H_2S$ and $O_2$ is contacted with activated carbon. | $F_0$ (Control) | 140 | The same as above, but/ 95 the amount of sulfur supported varies among particles of activated carbon. | 65 | 48 | 29 | |
| Not treated | A (Control) | — | — | 5 | 0 | 0 | 0 |

EXAMPLE 7

From activated carbon G of 10 to 24 mesh having a BET surface area of 950 m²/g, there was prepared activated carbon having as supported thereon a mixture of sulfur and other components.

(1) Activated carbon H having as supported thereon S-KI 45 ml of an aqueous solution of 1.0 g of KI was evenly sprayed on 100 g of activated carbon G with stirring to allow KI to adhere to the activated carbon. 5 g of sulfur of not more than 20 mesh was poured onto the activated carbon, and stirring was continued for about 10 minutes to coat the surface of the activated carbon with sulfur. The activated carbon as obtained by the above procedure was heated in air at 130° C. for 2 hours.

(2) Activated carbon I having as supported thereon S-KI-FeSO₄

45 ml of an aqueous solution containing 1.0 g of KI and 2.0 g of FeSO₄ was evenly sprayed on 100 g of activated carbon G with stirring to allow KI and FeSO₄ to adhere to the activated carbon. 3 g of sulfur of not more than 20 mesh was poured onto the activated carbon, and stirring was continued for about 10 minutes to coat the surface of the activated carbon with sulfur. The activated carbon as obtained by the above procedure was heated in air at 150° C. for 2 hours.

(3) Activated carbon J having as supported thereon S-KBr-Fe(NO₃)₃:

48 ml of aqueous ethanol (5 ml of ethanol with the remaining 43 ml of water; sulfur contained in the state of suspension) containing 1.0 g of KBr, 2.0 g of Fe(NO₃)₃ and 3.0 g of sulfur of not more than 100 mesh was evenly sprayed on 100 g of activated carbon G with stirring, and then heated in an atmosphere of nitrogen gas at 115° C. for 1 hour, whereby each of the activated carbon samples was found to have sulfur settled and adhered almost uniformly inside pores of the activated carbon.

25 ml each of the activated carbon samples H, I and J as obtained by the above procedures was packed into a 4 cm⌀ glass tube, and nitrogen gas of 25° C. containing 5.0 mg/m³ of mercury vapor was passed through each tube at a linear flow rate of 60 cm/sec to conduct the breakthrough adsorption tests for mercury vapor. The results are as shown in Table 7.

TABLE 7

| Sample No. | Component supported | Percent removal of mercury vapor at the elasped time shown below | | | |
|---|---|---|---|---|---|
| | | 1 hr. | 5 hrs. | 10 hrs. | 20 hrs. |
| H | S—KI | 100 | 95 | 71 | 35 |
| I | S—KI—FeSO₄ | 100 | 100 | 93 | 65 |
| J | S—KBr—Fe(NO₃)₃ | 100 | 100 | 90 | 52 |

What is claimed is:

1. A process for the removal of mercury vapor from a gas containing the same, which comprises contacting the gas with an adsorbent comprising an activated carbon having as supported thereon (1) one or more components included in one of the three groups shown below and (2) one or more components included in the remaining two groups shown below:

| Group | Component |
|---|---|
| I | sulfur |
| II | sulfate and nitrate of Al, V, Fe, Co, Ni, Cu, Zn or NH₄ |
| III | oxide of iodine, oxyacid corresponding to the oxide of iodine, salt of said oxyacid, and bromide and iodide of K, Na or NH₄ |

2. A process as claimed in claim 1, wherein the one or more components included in one of the three groups is sulfur included in Group I, and the one or more components included in the remaining two groups are one or more components included in Group II.

3. A process as claimed in claim 1, wherein the one or more components included in one of the three groups is sulfur included in Group I, and the one or more components included in the remaining two groups are one or more components included in Group III.

4. A process as claimed in claim 1, wherein the one or more components included in the remaining two groups are one or more components included in one of the remaining two groups and one or more components included in the other of the remaining two groups.

5. A process as claimed in claim 1, wherein each of the components is supported on the activated carbon so that the amount of sulfur, when used, is in the range of from 10 to 800 mg per g of activated carbon, the total amount of the components included in Group II, when used, is in the range of from 5 to 500 mg per g of activated carbon, and the total amount of the components included in Group III, when used, is in the range of from 1 to 500 mg per g of activated carbon.

6. A process as claimed in claim 1, wherein the activated carbon is one having as supported thereon sulfur and potassium iodide.

7. A process as claimed in claim 1, wherein the activated carbon is one having as supported thereon sulfur and ferrous sulfate.

8. A process as claimed in claim 1, wherein the activated carbon is one having as supported thereon sulfur, potassium idoide and ferrous sulfate.

9. An adsorbent for the removal of mercury vapor, which comprises an activated carbon having as supported thereon (1) one or more components included in one of the three groups shown below and (2) one or more components included in the remaining two groups shown below:

| Group | Component |
|---|---|
| I | sulfur |
| II | sulfate and nitrate of Al, V, Fe, Co, Ni, Cu, Zn or $NH_4$ |
| III | oxide of iodine, oxyacid corresponding to the oxide of iodine, salt of said oxyacid, and bromide and iodide of K, Na or $NH_4$ |

10. An adsorbent as claimed in claim 9, wherein the one or more components included in one of the three groups is sulfur included in Group I, and the one or more components included in the remaining two groups are one or more components included in Group II.

11. An adsorbent as claimed in claim 9, wherein the one or more components included in one of the three groups is sulfur included in Group I, and the one or more components included in the remaining two groups are one or more components included in Group III.

12. An adsorbent as claimed in claim 9, wherein the one or more components included in the remaining two groups are one or more components included in one of the remaining two groups and one or more components included in the other of the remaining two groups.

13. An adsorbent as claimed in claim 9, wherein each of the components is supported on the activated carbon so that the amount of sulfur, when used, is in the range of from 10 to 800 mg per g of activated carbon, the total amount of the components included in Group II, when used, is in the range of from 5 to 500 mg per g of activated carbon, and the total amount of the components included in Group III, when used, is in the range of from 1 to 500 mg per g of activated carbon.

14. An adsorbent as claimed in claim 9, wherein the activated carbon is one having as supported thereon sulfur and potassium iodide.

15. An adsorbent as claimed in claim 9, wherein the activated carbon is one having as supported thereon sulfur and ferrous sulfate.

16. An adsorbent as claimed in claim 9, wherein the activated carbon is one having as supported thereon sulfur, potassium iodide and ferrous sulfate.

17. A process for producing an activated carbon having sulfur as supported thereon, which comprises mixing activated carbon with finely powdered sulfur and heating the resultant mixture at 110° to 350° C. for not less than 30 minutes.

18. A process as claimed in claim 17, wherein the resultant mixture is heated at 110° to 300° C.

* * * * *